US008682820B2

(12) United States Patent
Robinson et al.

(10) Patent No.: US 8,682,820 B2
(45) Date of Patent: Mar. 25, 2014

(54) ON DEMAND MULTI-OBJECTIVE NETWORK OPTIMIZATION

(75) Inventors: Philip Robinson, Belfast (GB); Alexandru-Florian Antonescu, Winterthur (CH); Marc Brogle, Opfikon (CH); Alessandro Manfredi, Rome (IT); Luuk van Laarhoven, Udenhout (NL)

(73) Assignee: SAP AG, Walldorf (DE)

( * ) Notice: Subject to any disclaimer, the term of this patent is extended or adjusted under 35 U.S.C. 154(b) by 301 days.

(21) Appl. No.: 13/287,687

(22) Filed: Nov. 2, 2011

(65) Prior Publication Data
US 2013/0110752 A1  May 2, 2013

(51) Int. Cl.
*G06F 15/18* (2006.01)
*G06N 3/02* (2006.01)

(52) U.S. Cl.
CPC .......................................... *G06N 3/02* (2013.01)
USPC ............................................. 706/20; 709/220

(58) Field of Classification Search
None
See application file for complete search history.

(56) References Cited

U.S. PATENT DOCUMENTS

| 2008/0256010 A1 | 10/2008 | Moran et al. | |
| 2010/0223217 A1* | 9/2010 | Little | 706/19 |

OTHER PUBLICATIONS

Sadeka Islam, et al., "Empirical prediction models for adaptive resource provisioning in the cloud," Future Generation Computer Systems, vol. 28, No. 1, May 28, 2011, pp. 155-162.
Eduard Escalona et al., "Geysers: A Novel Architecture for Virtualization and Co-Provisioning of Dynamic Optical Networks and IT Services," Future Network & Mobile Summit, 2011, IEEE, Jun. 15, 2011, pp. 1-8.
Jia Rao et al, "VCONF: A Reinforcement Learning Approach to Virtual Machines Auto-configuration," Proceedings of the 6th International Conference on Autonomic Computing, ICAC, Jan. 1, 2009, pp. 137-146.
Sadeka Islam et al., "An Empirical Study into Adaptive Resource Provisioning in the Cloud," IEEE International Conference on Utility and Cloud Computing, Dec. 14, 2010, retrieved from internet at http://www.nicta.com.au/ pub?doc=4349, pp. 1-8.
Jia Rao et al., "A Distributed Self-learning Approach for Elastic Provisioning of Virtualized Cloud Resources," 19th Annual IEEE International Symposium on Modelling, Analysis and Simulation of Computer and Telecommunication Systems (Mascots), Jul. 25, 2011, pp. 45-54.
Eddy Caron et al., "Forecasting for Grid and Cloud Computing On-Demand Resources Based on Pattern Matching," 2010 IEEE 2nd IEEE International Conference on Computing Technology and Science, IEEE, Nov. 30, 2010, pp. 456-463.
Josep LI. Berral et al, "Towards energy-aware scheduling in data centers using machine learning," Proceedings of the 1st International Conference on Energy Efficient Computing and Networking, E-Energy, Jan. 1, 2010, pp. 215-224.

(Continued)

*Primary Examiner* — Alan Chen
(74) *Attorney, Agent, or Firm* — Fish & Richardson P.C.

(57) ABSTRACT

Implementations of the present disclosure include methods, systems, and computer-readable storage mediums for selecting an on-demand technology configuration, including receiving a request, the request including a plurality of properties, processing the request using a plurality of classifiers to generate a plurality of request classes associated with the plurality of properties, processing the plurality of request classes using a first neural network to identify one or more technologies relevant to the request, processing each of the one or more technologies using a second neural network to identify one or more technology configurations for each of the one or more technologies, and processing each of the one or more technology configurations to identify a target technology configuration.

20 Claims, 4 Drawing Sheets

(56) References Cited

OTHER PUBLICATIONS

European Examiner, Markus Volkmer, European Search Report for European Application No. 12007379, dated Feb. 15, 2013, 9 pages.
Douglas Gourlay, Cisco Blog, "What Is Not Networking for the Cloud," Jan. 8, 2009, retrieved from <http://blogs.cisco.com/datacenter/what_is_not_networking_for_the_cloud/>, 7 pages.
Lavanya Ramakrishnan et al., "On-demand Overlay Networks for Large Scientific Data Transfers" Proceedings of the 10th IEEE/ACM International Conference on Cluster, Cloud and Grid Computing (CCGrid'10), May 2010, pp. 359-367.
Michael Keen, "Virtualized WAN Optimization: The Road to Cloud Computing," DABCC.com, Oct. 2009, 10 pages.
aCelera, WAN Optimization Virtual Appliances, retrieved on Oct. 11, 2012, from <http://www.certeon.com/products/aCelera_Virtual_Appliance.asp>, 1 page.
Akamai Technologies, retrieved on Oct. 11, 2012, from <http://www.akamai.com>, 1 page.
"Amazon CloudFront," Amazon Web Services, retrieved on Oct. 11, 2012, from <http://aws.amazon.com/cloudfront/>, 10 pages.
N. Bartolini et al., "A Walk Through Content Delivery Networks," Proceedings of the IEEE / ACM Mascots 2003, LNCS 2965, Oct. 2003, pp. 1-25.
JTK, "Anycast Addressing on the Internet," Kuro5hin, Jan. 2, 2004, retrieved from <http://aharp.ittns.northwestern.edu/papers/k5-anycast/index.html>, 7 pages.
WAN Optimization, retrieved on Oct. 11, 2012, from <http://www.wanoptimization.org/>, 2 pages.
Brian L. Tierney et al., "A Network-Aware Distributed Storage Cache for Data Intensive Environments," Proceedings of the Proceeding of the Eighth IEEE International Symposium on High Performance Distributed Computing (HPDC-8), Aug. 1999, pp. 185-193.
Chin P. Guok et al., "ESnet On-demand Secure Circuits and Advance Reservation System (OSCARS)," GridNets 2006, Oct. 2006, 12 pages.
Chin P. Guok et al., "Improving the Bulk Data Transfer Experience," Int. J. Internet Protocol Technology, vol. 3, No. 1, 2008, pp. 46-53.
Ning Zhang et al., "Research on Traffic Flow Optimization in Optical Network," Proceedings of the Second International Workshop on Education Technology and Computer Science, ETCS 2010, Mar. 2009, pp. 375-378.
Phoebus, DAMSL, retrieved on Oct. 11, 2012, from <http://damsl.cs.indiana.edu/projects/phoebus/about.php>, 1 page.
Bandwidth on Demand (BoD) Services, Verizon, retrieved on Oct. 11, 2012, from <http://www22.verizon.com/wholesale/solutions/solution/bod.html>, 3 pages.
Replify, retrieved on Oct. 11, 2012, from <http://www.replify.com/>, 2 pages.
Mehmet Balman et al., "A Flexible Reservation Algorithm for Advance Network Provisioning," Proceedings of the 2010 ACM/IEEE International Conference for High Performance Computing, Networking, Storage and Analysis (SC'10), pp. 1-11, Nov. 2010.
Dimitrios Katramatos et al., "Establishment and Management of Virtual End-to-End QoS Paths Through Modern Hybrid WANs with TeraPaths," Proceedings of the 2009 First International Conference on Evolving Internet, Internet'09, pp. 39-45, Aug. 2009.
Intune Networks, retrieved on Oct. 11, 2012, from <http://www.intunenetworks.com>, 1 page.
Tataphoton, retrieved on Oct. 11, 2012, from <http://www.tataphoton.com/tata-photon-bod.aspx>, 2 pages.
Riverbed, retrieved on Oct. 11, 2012, from <http://www.riverbed.com/us/products/steelhead_appliance/index.php>, 15 pages.
Citrix, NetScaler Branch Repeater, retrieved on Oct. 11, 2012, from <http://www.citrix.com/English/ps2/products/feature.asp?contentID=1686852>, 2 pages.
Blue Coat, CacheFlow, retrieved on Oct. 11, 2012, from <http://www.bluecoat.com/products/cacheflow>, 2 pages.
Blue Coat, Solution Brief: MACH5 Acceleration Technology, 2007, retrieved on Oct. 11, 2012, from <http://www.bluecoat.com/doc/797>, 2 pages.
Differentiated Services, Datatracker.ietf.org, retrieved on Oct. 11, 2012, from <http://datatracker.ietf.org/wg/diffserv/charter/>, 2 pages.
Replify Accelerator, Replify, retrieved on Oct. 11, 2012, from <http://www.replify.com/products/replify-accelerator/>, 2 pages.
Cisco Systems, Wide Area Application Services (WAAS) Software, retrieved on Oct. 11, 2012, from <http://www.cisco.com/en/US/products/ps6870/index.html>, 5 pages.

\* cited by examiner

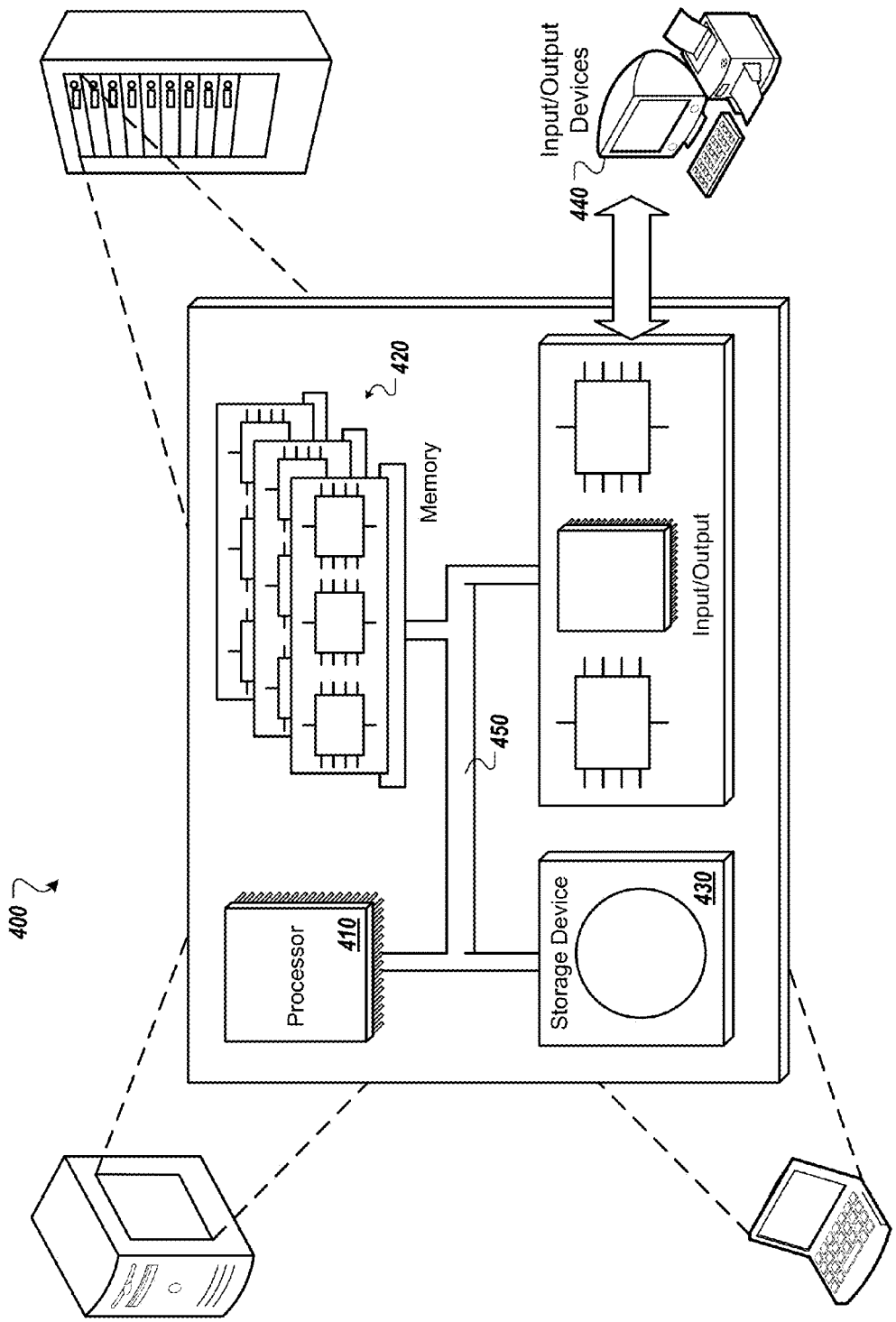

ON DEMAND MULTI-OBJECTIVE NETWORK OPTIMIZATION

BACKGROUND

Geographic distribution of enterprise employees, enterprise datacenters, and cloud-based resources has increased the need to transfer data among information technology (IT) system components that are deployed at such distributed locations. These components can be connected through a wide area network (WAN). Due to increasing virtualization and an increasing demand for infrastructure, high-availability systems have been burdened with transferring several bytes of data between geographically dispersed locations. Furthermore, these systems have been tasked with transferring the data as fast as possible in order to avoid business downtime and losses.

For example, large enterprises often need to rapidly migrate virtual machine (VM) snapshots among various locations in order to reduce the effective distance among users, data and the processing of the data. However, VM snapshots can be double the size of the running VM in memory. As there can already be latency involved in restarting a snapshot, the transfer time of the migration should be as short as possible. Real-time analytics will include data from different sources and at different locations. Other examples involving provisioning of high-speed systems include changes in analytics queries, which can cause changes in the topology of data sources, data caches and processors, such that a previous network configuration is no longer optimal. In the scientific community, there is a need for efficient on-demand data transfer services that can transfer experimental results (which can include hundreds of terabytes of data) from locations where the results are generated to locations where the results are analyzed. Maintaining constant high-speed connections is impractical in addressing such needs, because they can be expensive, may not scale with deployed systems, and may be controlled by network operators. Accordingly, any change or improvement in the provisioning of high-speed systems could depend on slow and cost-inefficient interactions (e.g., an interaction to modify the quality of service (QoS) guarantees stated in a service level agreement (SLA)). Thus, there is a need for more flexibility in the approach and cost modeling of provisioning high-speed data transfers.

SUMMARY

Implementations of the present disclosure include computer-implemented methods for selecting an on-demand technology configuration, the methods being performed using one or more processors and including the actions of receiving a request, the request including a plurality of properties, processing the request using a plurality of classifiers to generate a plurality of request classes associated with the plurality of properties, processing the plurality of request classes using a first neural network to identify one or more technologies relevant to the request, processing each of the one or more technologies using a second neural network to identify one or more technology configurations for each of the one or more technologies, and processing each of the one or more technology configurations to identify a target technology configuration.

In some implementations, the plurality of properties includes context properties, endpoint properties, endpoint capability properties, and transfer properties.

In some implementations, the context properties are defined based on one or more context sub-properties including a request identifier, a request time, a setup deadline, a lifetime, a service level, and a set of cost constraints.

In some implementations, the endpoint properties are defined based on one or more endpoint sub-properties including an identifier, an address, a location, and a type.

In some implementations, the endpoint capability properties are defined based on one or more endpoint capability sub-properties including a storage capacity, a processor, and interfaces.

In some implementations, the transfer properties are defined based on one or more transfer sub-properties including a payload size, a throughput, a directionality, and a protocol.

In some implementations, the plurality of classifiers includes a payload, a destination, a set of cost constraints, and a set of time constraints.

In some implementations, processing the plurality of request classes further includes receiving taxonomy information and asset database information.

In some implementations, processing each of the one or more technologies further includes receiving configuration information and provider information.

In some implementations, processing each of the one or more technologies further includes providing one or more acceptance levels.

In some implementations, the one or more acceptance levels include unaccepted, likely unaccepted, indecisive, likely accepted, and accepted.

In some implementations, processing each of the one or more technology configurations further includes applying rules.

In some implementations, actions further include providing the target technology configuration.

In some implementations, actions further include generating a manual input request.

In some implementations, the manual input request includes a proposed solution.

In some implementations, the manual input request includes the request.

In some implementations, the one or more technologies include a dedicated link technology, a content distribution network technology, a hardware-based acceleration solution technology, a software-based acceleration solution technology, and a best-effort internet solution technology.

In some implementations, the one or more technology configurations include a local instance configuration, a local knowledge configuration, local resources configuration, a remote service configuration, and a new remote service configuration.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 4 is a schematic illustration of example computer systems that can be used to execute implementations of the present disclosure.

Like reference symbols in the various drawings indicate like elements.

DETAILED DESCRIPTION

Figure 1:
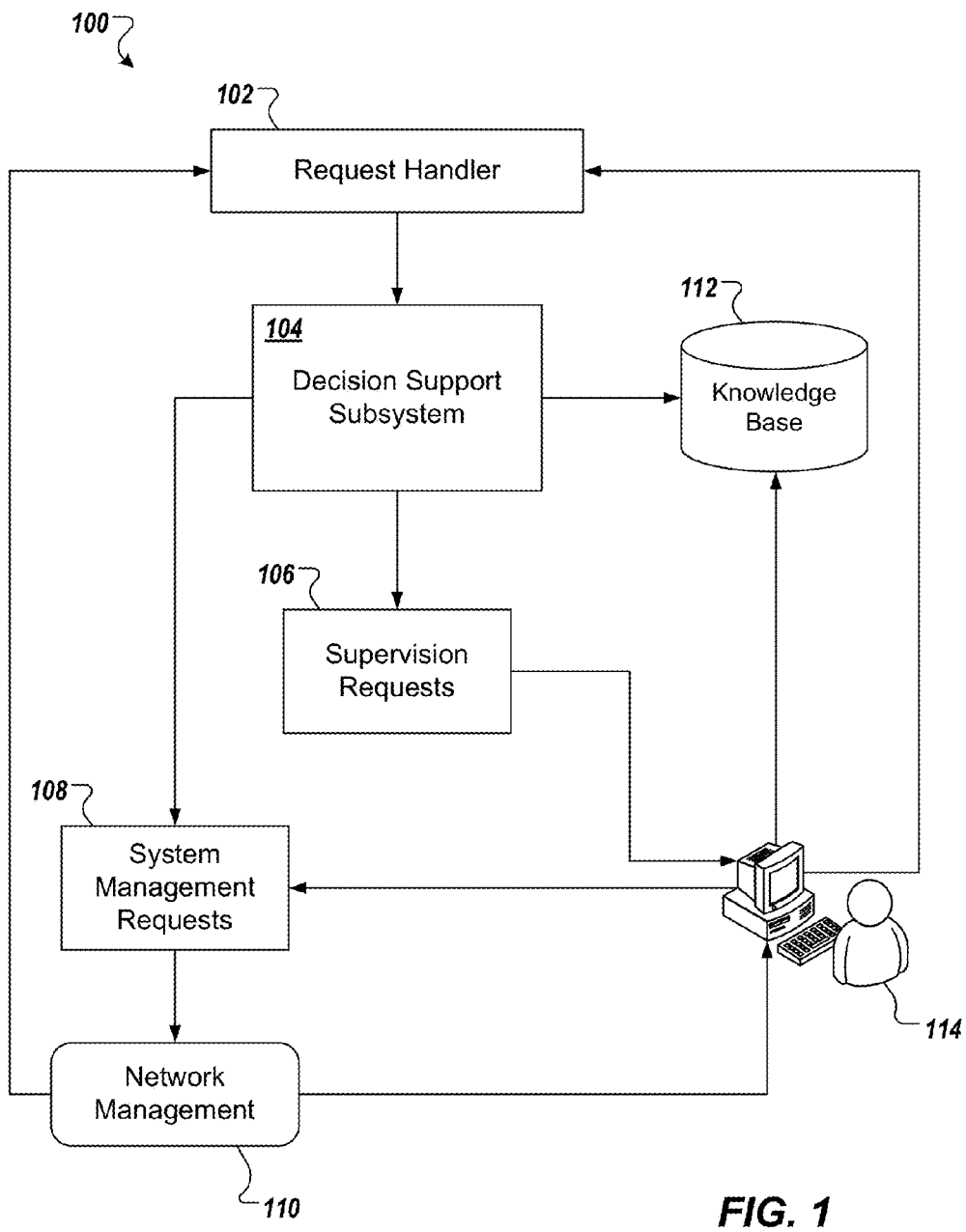
FIG. 1 depicts an example system that can be implemented in accordance with the present disclosure.

Implementations of the present disclosure are generally directed to providing on demand, multi-objective network optimization (ODMONO). More particularly, implementations of the present disclosure provide an ODMONO architecture that processes constraints using taxonomy, neural networks and/or rule-based expert systems to provide a number of alternative network configurations. The ODMONO architecture is "on-demand," as the network configurations are purpose-built for the specific transfer, constraints and environment, and is "multi-objective" in view of the alternative network configurations that are provided. A network configuration can be selected for providing the necessary network resources based on multiple objectives. Example objectives can include required capacity, reachability of destination, time constraints and cost constraints. In this manner, required network capacity is provided and is deployed when it is required and for the period of time that it is required. This can be advantageous for IT service providers in that it can enable the providers to optimize their network usage and expenditures. Resultant savings can be extended to service consumers without reducing the quality of service guarantees offered to the consumers.

As discussed in further detail herein, approaches can be combined to implement the ODMONO architectures. These approaches can include one or more of a taxonomy technique, neural networks, and a rule-based expert system. Taxonomy can be provided as the organization of different types of network optimization technologies into different categories, as well as the identification of relationships and dependencies among the different types of network optimization technologies. In some implementations, the taxonomy network optimization can be organized as a decision-making workflow of staged technology selection. In some examples, this can be implemented as a decision tree.

Implementations of the present disclosure can provide for taxonomic classification of network optimization technologies for evaluation, comparison and selection; classification of networking requirements and constraints for system deployments and data transfers to enable selection of optimal networking; seamless support of manual, semi-automated (i.e., supervised learning) and fully automated (rule-based) network configuration management in a single system and workflow; constant improvement of automated network technology selection and configuration using supervisory input; and tuning of network optimization technology selection and configuration automation in an operational context, which can include business constraints, administrator capabilities and administrator preferences.

In some implementations, neural networks can be used to derive meaning from complicated, imprecise data in order to extract patterns, detect trends and suggest options that are too complex to be derived by humans alone. In some examples, neural networks differ algorithmically and architecturally from standard, rule-based models of decision-making in that there may be no assumption of complete knowledge initially. The model can continue to gain knowledge over time, and there may be inherent provisions for parallelism in the design and interconnection of the processing elements. Thus, and in some implementations, the decision tree can be used to guide and structure the selection process of network optimization technologies, while neural networks may be used to make the actual selection.

Referring now to FIG. 1, implementations of the present disclosure can use a combination of taxonomy, neural networks, and rule-based expert systems within a single decision support model 100. The example decision support model 100 is based on supervised learning, which allows an administrator to provide updated knowledge to the decision system classification tree. The decision support model 100 also shows dependencies among the different techniques. The decision support model 100 includes a request handler 102, a decision support subsystem 104, a network management subsystem 110, a knowledge base 112 and a computing device 114. In some examples, the computing device 114 can be used by an agent 116 (e.g., a supervisor).

In some implementations, the request handler 102 can receive decision support requests and further prepare and parse the requests into a format that can be handled by the decision support subsystem 104. In some examples, the request handler 102 can be provided as one or more computer programs that can be executed using one or more computing devices (e.g., servers). The decision support subsystem 104 can receive the prepared requests, as well as relevant knowledge from the knowledge base 112. In some examples, the decision support subsystem 104 has insufficient information and sends a supervision request 106 to the supervisor 116 (e.g., through the computing device 114) for additional knowledge. In some examples, the decision support subsystem 104 has sufficient knowledge and a capability to make unsupervised decisions about network provisioning. In this case, the decision support subsystem 104 can generate and send one or more system management requests 108 to the network management subsystem 110. In some examples, the network management subsystem 110 can provide feedback to the supervisor 116 (e.g., through the computing device 114) regarding the status of management requests and network links. In some examples, the supervisor 116 can send manual system management requests 108 (e.g., using the computing device 114) for network links to be provisioned. In some examples, the decision support subsystem 104 can be provided as one or more computer programs that can be executed using one or more computing devices (e.g., servers).

The knowledge base 112 can enable updating, maintaining, and querying of structured information about the state and capabilities of networking and network management available for supporting transfers. In some implementations, the supervisor 116 (e.g., using the computing device) can initialize and update the knowledge base 112. In some examples, one or both of the supervisor 116 and the network management subsystem 110 can send requests for decision support to a request handler 102. In some examples, the knowledge base 112 includes the taxonomy that filters out relevant alternatives given the features and constraints defined for the link to be established. In the context of ODMONO, for example, several solutions to optimize or accelerate a large-volume data transfer over WAN can be considered among software-based, hardware-based and third party services. When a transfer over WAN is requested, the specification can include one or more of a volume of the transfer (i.e., the size of the data), a time schedule, a service type, a route (i.e., endpoints involved and possible intermediate steps) and a set of transfer constraints. Example time schedules include "now," "as soon as possible," specific time slots and deadlines. Example service types include point-to-point, point-to-multipoint and content delivery. In some examples, transfer constraints can include encryption rules and geographic route constraints.

Based on these specifications, the availability of the assets and the solutions available at the various endpoints along the route path, a set of alternative solutions or compositions of solutions can be deterministically computed. The output can be provided to a more complex decision support system in order to assist the administrator in selecting the best alternative. Once the feasible solutions are identified, the smart expert system (trained with historical data that represents past experiences with different solutions) can infer which solution is best to select when no other deterministic criteria apply.

In some implementations, the knowledge base 112 includes structured information used to describe the various types of assets, services and providers available for satisfying requests for capabilities stored within a configuration management database (CMDB) or asset database. In some examples, the basic concepts and data structures of a CMDB are records of unique items and records of relationships and associations among the various items. Each item may have a unique provider, an item type, an item class, a set of optional configurations and a set of features used to advertise and classify them. Furthermore, each item can have a unique identifier and a unique uniform resource identifier (URI). In some examples, the URI may be related to the provider of the item, which can be local or remote. Thus, the URI provides an initial path for accessing the item and manipulating its state or configuration.

In some examples, the provider can be a person, department or organization responsible for the asset. The provider further has associated contact information and an associated geographic location.

In some examples, the item type can be of a hardware nature (a physical asset), a software nature (a digital/electronic asset) or a system nature (a collection of various types).

The item class classifies the functionality that can be provided by the asset. Example item classes include storage (used for storing and providing access to data), processing (used for accepting data, performing manipulations and calculations and providing output), networking (used for transporting data between assets and locations) and integrated (a collection of asset classes).

The configuration is an assignment of values to selected parameters for the operation of a specific asset. In some examples, each configuration can be associated with a specific service level, which is a declaration of performance, availability, reliability and security provided by a configuration. In some examples, the service level can further be associated with a price.

In some implementations, a feature can include a collection of keywords that describe the usage and capabilities of the asset.

In some examples, the data model of the asset database can be changed or extended. However, it can be assumed that queries on the data model can still be performed, as this represents basic knowledge needed for selecting an optimal solution.

Another component of the knowledge base 112 is the set of basic, deterministic rules for selecting a networking solution for a given set of input: WHEN <feature-pattern> THEN <configuration>. A feature pattern includes a known collection of classifiers used to match a set of inputs to a predefined class of requirement. In some examples, a classifier can include an input mask, which is a means of validating input to be analysed by the classifier, and a set function, which states whether or not an input can be labelled as belonging to a predefined category. In some examples, a set function can be a Boolean set function, which returns true or false concerning the matching of the input to the label. In some examples, a set function can be a fuzzy function, which returns a rating of the match between 0 and 1.

Basic classifiers in the ODMONO solution include payload classifiers, destination classifiers, cost classifiers and time classifiers. A payload classifier can classify a request based on its sizes (e.g., small, medium, large and huge). A destination classifier can classify a request based on a transmission distance (e.g., local, near and far). In some examples, a destination classifier can further associate properties with the request, such as unknown, low speed and high speed. A cost classifier can classify a request based on price constraint (e.g., negligible, low, high and unlimited). A time classifier can classify a request based on a time constraint (e.g., immediate, quick and delayed). In some examples, a time classifier can designate a concrete time frame. In some examples, other, non-basic classifiers can be utilized, such as criticality and secrecy.

In some implementations, a configuration can point to a parameterized, executable script and the parameter values for the selected instance. In some examples, the parameter value cannot be determined, and thus, there is a need for input from the supervisor 116.

Figure 2:
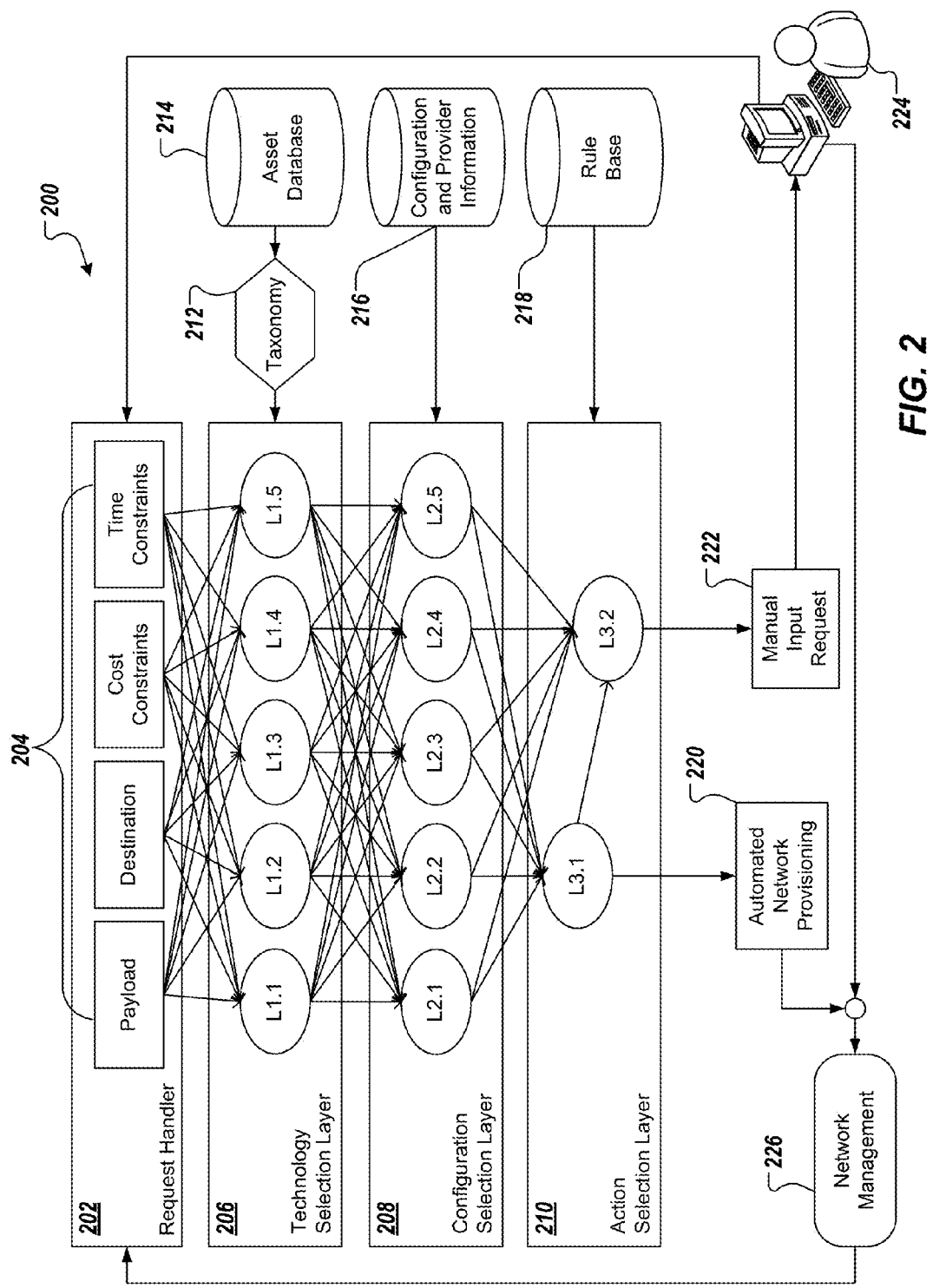
FIG. 2 depicts an example system architecture that can be implemented in accordance with the present disclosure.

FIG. 2 provides more detail of the ODMONO architecture of the present disclosure. The ODMONO architecture 200 of FIG. 2 includes a request handler 202 and one or more layers, including a technology selection layer 206, a configuration selection layer 208 and an action selection layer 210 that function to support a supervisor 224 (i.e., a human administrator) in making optimal network provisioning decisions. The ODMONO architecture 200 further includes a taxonomy 212, an asset database 214, a configuration and provider information database 216, a rule base 218 and a network management subsystem 226.

The request handler 202 can be the entry point for the decision support subsystem and the general ODMONO process. Each request received at the request handler 202 can include one or more sections that group input data relevant to making network provisioning decisions. In some implementations, the request handler 202 parses the request and may be initialized with a set of one or more request classifiers 204 defined for the system. For example, the classifiers 204 can include a payload classifier, a destination classifier, a cost constraints classifier and a time constraints classifier, as discussed above. In some implementations, the sections for grouping input data can include one or more of context, end-point, end-point capabilities and transfer properties.

In some examples, the context section includes metadata about the request received at the request handler 202 and can describe how to identify and classify the request. Within the context section are several properties including a request ID, a request time, a setup deadline, a lifetime, a service level and a set of cost constraints. In some implementations, the request ID is a unique identifier of the request and can be a sequence of numbers associated with the source of the request (e.g., an administrator or network management system). In some examples, the request time can serve as a timestamp of when the request was issued. In some examples, the setup deadline can provide a time constraint for satisfying the request. In some implementations, the lifetime can define the length of time for which the network is required. In some examples, the lifetime can be de-provisioned once the lifetime expires. The service level can provide the level of service that is expected based on a rating scheme, for example. In some implementations, the cost constraints can limit the type of network technology that is utilized and the type of solution that is provided.

In some implementations, a request can have two associated endpoints that can communicate with each other. In some examples, the endpoints are uniquely identifiable and are typically located at different geographic locations. The endpoint section of the request can include one or more of an identifier, an address, a location and a type. In some examples, the identifier may include a name and a namespace used to uniquely refer to an endpoint. In some implementations, the address can be the known, reachable communications address (static or dynamic) of the endpoint. In some examples, the address can be changed once the technology for linking the two endpoints has been selected, as the address schema may depend on the selected technology. In some examples, the location can be the geographic location of the endpoint. In some implementations, the type can be the class of the information technology element at the endpoint. For example, the type can be a server, a storage, a cluster or any other type of information technology element.

Each endpoint can further be defined by one or more of a storage capacity, a processor and an interface. In some implementations, the storage capacity is the amount of data that can be stored at the endpoint, which may be relevant for considering caching solutions. In some examples, the processor describes the CPU speed of the endpoint and can influence the receive rate and send rate of the endpoint.

In some implementations, the transfer properties within a request can describe the requirements of a solution that are to serve the request. The transfer properties can include one or more of a payload size, a throughput, a directionality and a protocol. In some examples, the payload size is the size of data packets that are to be transmitted over the link. In some examples, the throughput is the speed at which single packets of a certain size are expected to travel from one point to another. In some examples, the directionality can be uni-directional or bi-directional. In some implementations, the protocol can define whether there are any preferences or constraints on the protocol to be utilized.

As discussed in further detail herein, each of the technology selection layer 206, the configuration selection layer 208 and the action selection layer 210 can be provided as a neural network. In some implementations, the aim of a neural network can be to derive meaning from imprecise data, which can result in the extraction of patterns, the detection of trends and the suggestion of options that are too complex to be derived by humans alone. In some examples, the complexity can derive from the large number of alternatives and volumes of data that need consideration in order to reach a conclusion. Neural networks are computational models that follow the concept of how the brain is structured and wired based on a complex interconnection of simple neurons. The problem addressed by the ODMONO architecture of the present disclosure can be expressed as a classification problem in neural networks for determining the best network resource configuration solution for a given transmission request.

In some examples, a classification problem can concern how to identify patterns in raw input data elements $X=(x_1, \ldots, x_n)$ and assign them to higher level, a priori labels $Y=(y_1, \ldots, y_n)$. It may then be easier to make decisions using the higher-level labels as opposed to the raw input data. Thus, a function F may be discovered that maps the data to the labels, $F:X \rightarrow Y$. For each layer in the ODMONO architecture, X can represent the set of objective attributes for the request, which can include one or more of cost, throughput, bandwidth and reliability. Y can represent a network configuration solution that satisfies X.

At the technology solution layer 206, the best technology solution is still yet to be determined. In some implementations, the technology solution layer 206 can include a plurality of neurons, provided as nodes L1.1-L1.5 in FIG. 2. Each neuron represent a class of technology that may be utilized to optimize a transfer request based on various constraints associated with the request. In some cases, the same activation function can be used for each neuron. An example activation function can be provided as:

$$\text{activate} = \frac{\sum_{i=1}^{n} a(x_i)}{n} \geq \theta \qquad (1)$$

where $a(x)$ is an average acceptance, n is the number of request classifiers and $\theta$ is a threshold. In some examples, each neuron is activated and can provide output to the next layer if the average acceptance $a(x)$ for the n request classifiers $x_i$ is greater than the threshold $\theta$.

In some implementations, the acceptance function $a(x)$ can check the ability of a specific technology to satisfy classified constraints of the request and can return one or more values for each classifier. In some examples, $a(x)$ can return a value of 0.00 (unaccepted). Unaccepted indicates that the technology does not satisfy the request constraint. In some examples, $a(x)$ can return a value of 0.25 (likely unaccepted). Likely unaccepted indicates that the technology probably does not satisfy the request, but that more information can be acquired prior to committing to this rating. In some examples, $a(x)$ can return a value of 0.50 (indecisive). Indecisive indicates that there is insufficient information available to make a decision. In some examples, $a(x)$ can return a value of 0.75 (likely accepted). Likely accepted indicates that the technology probably satisfies the request constraint, but that more information can be acquired prior to committing to this rating. In some examples, $a(x)$ can return a value of 1.00 (accepted). Accepted indicates that the technology fully satisfies the request constraint.

In some implementations, each node of the neural network can represent a class of solution that can be provided for the request. In the technology selection layer 206, each of the nodes L1.1-L.1.5 can accept the set of transfer criteria from the classifiers 204 as input, check the taxonomy 212 and the asset database 214 for its properties, calculate the acceptance level of the solution class and provide an output that includes the acceptance and a classification of the solution class. In some examples, the node L1.1 can represent a dedicated link solution, the node L1.2 can represent a content distribution network solution, the node L1.3 can represent a hardware-based acceleration solution, the node L1.4 can represent a software-based acceleration solution, and the node L1.5 can represent a best effort Internet solution.

In some examples, a dedicated link can describe a solution for executing the transfer using a dedicated, physical link between two communicating parties. Thus, there is no contention for bandwidth or the channel, as the link is dedicated. The dedicated link can therefore be highly reliable and may be expected to be fast and isolated, yet it can be expensive to provision and own from the perspectives of time and cost. In some examples, dedicated links can use the point-to-point protocol (PPP), where both communicating parties have static endpoint addresses that are known to each other.

In a content distribution network, also known as a content delivery network (CDN), different nodes within a distributed network (and possibly at different providers) can maintain cached copies of data retrieval by clients in proximity. This can preserve bandwidth of the entire network and make transfers quicker, as clients can select the cache (or mirror) that is geographically or link-wise nearest in proximity. This, however, may result in the need to handle issues such as data freshness, because frequently updated data may not be a good candidate for CDNs. In some examples, the cost of using a CDN can be significantly cheaper than using a long-distance dedicated link between locations.

In some implementations, hardware-based acceleration approaches can perform one or more of traffic classification, prioritization, compression, localized caching and chatty protocol optimization. Based on the type of transfer to be performed between the two endpoints, the type of acceleration methods selected can vary. In some examples, hardware-based acceleration techniques can be implemented in specialized, dedicated hardware placed inside the domains of the communicating parties.

In some implementations, software-based acceleration approaches are similar to hardware-based acceleration approaches, except that software-based acceleration approaches can be implemented in software. Thus, the software-based acceleration approach may be less optimized, but may have more flexibility regarding computing and storage resources that can be made available and customized. Software-based acceleration can be implemented in one or more of several variations, including compression of data before placement on the WAN, data suppression of data already seen, data caching of most commonly-used data, WAN-optimized transport protocol and application proxies that filter unnecessary messages or batch the unnecessary messages for single transmission.

In some examples, the best effort Internet solution may be the cheapest of the solutions, because it is based on using whichever Internet-based connection is available that can allow the two endpoints to communicate with each other. In some examples, there may be no guaranteed knowledge about the intermediate points in the network and the actual delivery, delay and error rate.

Within the configuration selection later 208, the various configuration possibilities for a selected technology solution class can be evaluated. In some implementations, the configuration selection layer 208 can receive configuration and provider information 216 from the knowledge base. In the depicted example, the configuration selection layer 208 includes a plurality of configuration classes, represented by nodes L2.1-L2.5. Each node L2.1-L2.5 is associated with a technology solution class. In some examples, the activation function in the configuration selection layer 208 can be a simple Boolean function that checks whether the particular configuration option is available. In some examples, all nodes L1.1-L1.5 in the technology selection layer 206 can provide input to each of the nodes L2.1-L2.5 in the configuration selection layer 208.

In some implementations, the node L2.1 represents a local instance configuration class, node L2.2 represents a local knowledge configuration class, node L2.3 represents a local resources configuration class, node L2.4 represents a remote service configuration class, and node L2.5 represents a new remote service configuration class.

In some examples, a local instance is a pre-configured instance of the solution already running and is under the control of the network management subsystem 226, can satisfy the request and can be used without any additional modifications. In some instances, the local instance is considered the best case and can have a weight of 5.

For the local knowledge configuration, the solution might not be running, but there is a bundled specification of resources (devices, scripts, images, etc.) available and under the control of the network management subsystem 226 and might only require input parameters made available from the request. In some examples, the knowledge of how to initialize and automatically start up the solution is available. The local knowledge configuration class can have a weight of 4, as it may require more effort and time than the local instance configuration.

For the local resources configuration, it may be determined that the resources are available locally and under the control of the network management subsystem 226. However, in some implementations, there may still be a need to bundle and initialize the local resources in order to address the particular request. This can require some manual intervention and hence more effort and time than the local knowledge configuration. In some examples, the local resources configuration can have a weight of 3 and is a desirable configuration.

For a remote service configuration, a remote service can be required, such that the network management subsystem 226 can lose some of its control, if this configuration is selected. In some examples, the remote service configuration assumes that there exists a provider with a contract to provide an adequate service of the selected technology solution. In some examples, the remote service configuration can have a weight of 2.

In some implementations, the new remote service configuration includes a set of candidate providers of which one can be selected. In some examples, the new remote service configuration has a weight of 1, as the supervisor 224 can perform manual intervention to make the selection (unless there are rules already in place for making the selection).

In some implementations, the action selection layer 210 can make the final decision as to which solution configuration is optimal given the initial request. In some examples, the action selection layer 210 can make this decision by applying the rule base 218. In some implementations, the action selection layer 210 includes nodes, a selected solution node L3.1 and an input required node L3.2. In some examples, one node may be fired when there is a clear solution, and the other node may be fired when there are uncertainties or conflicts or no solution is detected. In some examples, this scenario can enable the system to improve over time by acquiring feedback from the supervisor 224.

In some implementations, the selected solution node L3.1 can have an ordered collection of strategies that may be executed based on their ratings. The selected solution node L3.1 can provide selected automated network provisioning

220. In some examples, the selected solution node can communicate with the network management subsystem 226 (connection not shown in FIG. 2).

In some implementations, the input required node L3.2 can have an ordered collection of strategies that may be executed; however, this node might only be fired when the node L3.1 does not select an automatic option. In such an instance, the node L3.2 generates a manual input request 222 to be sent to the system supervisor 224. The following table provides the conditions that determine whether the node L3.2 is triggered:

| Condition | Node L3.1 | Node L3.2 |
|---|---|---|
| Solution determined by rule-base equals solution determined by neural network | Sends automated solution provisioning request to network management subsystem | Does not fire and stores log of candidate solutions |
| Solution determined by rule-base is better than solution determined by neural network | Sends automated solution provisioning request to network by selecting solution from rule-base; subsequently modifies the weightings of the solutions to reflect this preference. | Does not fire and stores log of candidate solutions |
| Solution provided by neural network appears to be better than solution provided by rule-base | Triggers L3.2 with proposed solution, indicating that it appears to be better than rule-base solution | Presents proposal from L3.1 to the supervisor. If accepted, this replaces existing rule in the rule-base |
| No solution provided by rule-base | Triggers L3.2 with proposed solution; does not trigger as this represents an inconsistency with the knowledge base | Presents proposal from neural network to supervisor; if accepted, then new rule is created, such that this feature set condition will not cause an inconsistency during the next round |
| No solution determined by rule-base or neural network (by design, the neural network should always provide a solution, even if the solution is not optimal) | Triggers L3.2 | Presents original request to supervisor |

In some examples, the power of this approach is that, over time, the system can learn and improve its ability to select a network configuration for different classes of anomalous requests. In some implementations, if the supervisor 224 changes and the knowledge base is reset, then the system can assist a new supervisor in making reasonable choices about network configurations for requests, while building up its own knowledge base. Another feature of the input required configuration is the ability to present rational arguments for technology choices, such that traceability exists in the automation.

In some implementations, the network management subsystem 218 can be responsible for the setup and configuration of the network for the selected solution. The network management subsystem 218 can include one or more of an interpreter, a coordinator and a set of agents, which can be local agents or remote agents. For the case of remote agents, the interaction of remote agents may pass through a gateway, which can serve as a communication proxy and translate the commands to the proper format required by the remote agents, thus hiding their heterogeneity.

In some implementations, the workflow of the network management subsystem 218 can start with considering the set of commands to be executed in order to prepare the infrastructure to use the chosen solution. In some examples, each command corresponds to a set of instructions required to execute the command (in the form of scripts), which actually configures the network. The interpreter can take these two inputs and pass them to the coordinator. Based on the command and the scripts, the coordinator can determine whether or not their execution should be performed locally within the "home" network domain or if the request should be forwarded to a remote agent in another domain. In the latter case, the command may be sent through the gateway, which can adapt the command to the proper format for the remote agent to understand it and eventually execute it using its own instructions. In some examples, the instructions for the command can be passed to the proper local agent. In some implementations, a selected strategy can utilize a mix of both local and remote agent command executions.

Figure 3:
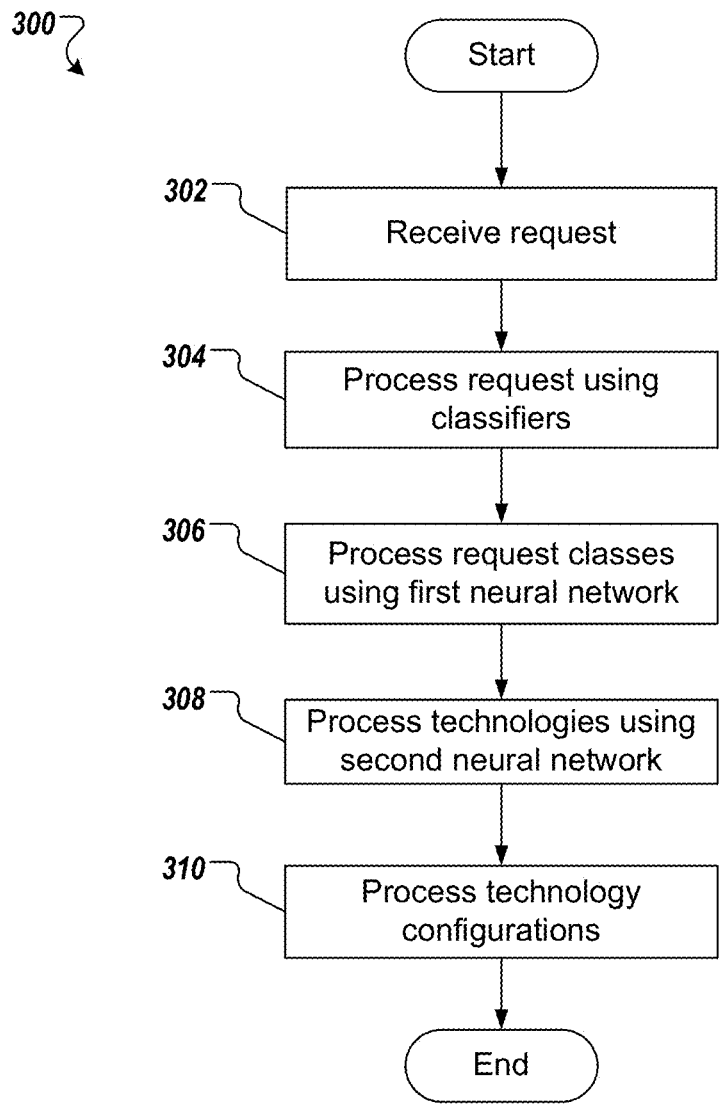
FIG. 3 is a flowchart depicting an example process that can be executed in accordance with implementations of the present disclosure.

FIG. 3 provides a flowchart depicting an example process 300 that can be executed in accordance with implementations of the ODMONO architecture provided herein. In some implementations, a request including a plurality of request properties is received (e.g., at the request handler 202 of FIG. 2) (302). The request is processed using one or more classifiers to generate several request classes associated with the request (304). For example, the classifiers can include one or more of payload, destination, cost and time classifiers. In some examples, the request classes can include one or more of context, endpoint, endpoint capabilities and transfer properties. The request classes are processed using a first neural network (e.g., the technology selection layer 206 of FIG. 2) (306). In some examples, and using inputs from taxonomy and the asset database, the technology selection layer can process the request classes to identify one or more technologies that are relevant to the request. In some examples, the relevant technologies can include those based on a dedicated link, a CDN, hardware-based acceleration, software-based acceleration or a best-effort internet solution.

Identified technologies are processed using a second neural network (e.g., the configuration selection layer 208 of FIG. 2)

(308). In some examples, and using configuration and provider information from the knowledge base, the configuration selection layer can process the one or more identified technologies to identify one or more configurations for each of the one or more identified technologies. Example technology configurations include local instance, local knowledge, local resources, remote service and new remote service. Each technology configuration is processed to identify a target technology configuration and/or to generate a request for manual selection (310). In some examples, and by applying the rule base, the action selection layer can process each of the one or more technology configurations to identify a target technology configuration for the request and thus provide automated network provisioning to the network management subsystem. In some implementations, no complete rule is available for making a decision, and the action selection layer can send a manual request to the supervisor to provide the necessary information for making the decision. In some examples, the request contains knowledge about relevant solutions that have already been acquired by the decision support subsystem.

As discussed above, benefits of using the ODMONO architecture of the present disclosure can be reflected by several enhancements that have the overall effect of reducing costs and avoiding sloppy provisioning. These enhancements include focus on on-demand services, avoidance of over-provisioned solutions, fast provisioning for fulfilling actual business needs while considering workload, deadline and cost constraints and, in some implementations, enabling a pay-per-use model. In this way, ODMONO can enable companies to make a release using a single solution, while knowing that other solutions can be obtained as-a-service. Given that additional techniques and commercial solutions for enhancing WAN data transfer are likely to be available in the future, ODMONO can be implemented flexibly for using different, evolving technologies over time. Benefits of the ODMONO architecture can be exemplified in several use cases, such as service relocation/fast application delivery, datacenter consolidation, and branch offices.

In the case of service relocation, the service may be running inside of a virtual machine (VM), which might not be able to reach the required performance due to a lack of resources at the current infrastructure provider. Thus, the service needs to be quickly relocated, potentially to a datacenter at a different geographic location. This could require the transfer of a massive amount of data (e.g., the VM image and the service data). Such a massive transfer could also be required in application delivery scenarios, where users in a specific region might need specific software service from an infrastructure with globally distributed locations. This can eventually result in the need for efficient, large-scale data transfer over a WAN. For such a scenario, ODMONO can quickly evaluate several alternative solutions to optimize the transfer by considering its knowledge of the current infrastructure status. The ODMONO system can therefore suggest the proper service for the transfer in time to deliver the application, while still satisfying the customer and optimizing costs.

In some examples, as part of IT globalization, a common trend of infrastructure consolidation is emerging, increasing the distance between the location where data and applications are hosted and the location of the end users. Such distances can increase the impact of network performance problems on enterprises. This can reduce the total cost of ownership (TCO) by consolidating storage and services on cutting edge hardware or infrastructure services, while still requiring efficient access to such resources from branch offices, employee mobility, other enterprise infrastructures (e.g., B2B services) and other general remote locations. To address such challenges, the ODMONO system can focus on on-demand services with the appropriate reactive behavior to avoid expensive over-provisioning, while still suggesting the proper solution to provide the needed performance.

In some examples, branch offices suffer from the problem of poor WAN transfer performance, which further affects the performance of employees working from multiple locations. Due to rapid globalization, remote offices, and outsourcing, this can be a challenging business problem, which highlights the importance of remote accessibility to company data for purposes such as making collaborative changes on data in almost-real time. In such cases, the ODMONO system focuses on reducing equipment and software costs and on-demand services (e.g., virtual appliances for a limited time period that are able to fulfill requirements for specific projects with particular scopes).

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selecting an on-demand technology configuration, the computer-implemented method comprising:

receiving, by one or more processors, a request, the request comprising a plurality of properties;

processing, by the one or more processors, the request using a plurality of classifiers to generate a plurality of request classes associated with the plurality of properties, each classifier classifying the request based on a respective property;

processing, by the one or more processors, the plurality of request classes using a first neural network to identify one or more technologies relevant to the request, each technology of the one or more technologies comprising one or more assets, each neuron of the first neural network representing a class of technology that can be utilized to address the request;

processing, by the one or more processors, each of the one or more technologies using a second neural network to identify one or more technology configurations for each of the one or more technologies, each neuron of the second neural network representing a respective configuration class, each technology configuration comprising, for a respective technology, one or more values of one or more parameters of respective assets of the one or more assets; and processing, by the one or more processors, each of the one or more technology configurations to identify a target technology configuration.

2. The computer-implemented method of claim 1, wherein the plurality of properties comprises context properties, endpoint properties, endpoint capability properties, and transfer properties.

3. The computer-implemented method of claim 2, wherein the context properties are defined based on one or more context sub-properties comprising a request identifier, a request time, a setup deadline, a lifetime, a service level, and a set of cost constraints.

4. The computer-implemented method of claim 2, wherein the endpoint properties are defined based on one or more endpoint sub-properties comprising an identifier, an address, a location, and a type.

5. The computer-implemented method of claim 2, wherein the endpoint capability properties are defined based on one or more endpoint capability sub-properties comprising a storage capacity, a processor, and interfaces.

6. The computer-implemented method of claim 2, wherein the transfer properties are defined based on one or more transfer sub-properties comprising a payload size, a throughput, a directionality, and a protocol.

7. The computer-implemented method of claim 1, wherein the plurality of classifiers comprises a payload, a destination, a set of cost constraints, and a set of time constraints.

8. The computer-implemented method of claim 1, wherein processing the plurality of request classes further comprises receiving taxonomy information and asset database information.

9. The computer-implemented method of claim 1, wherein processing each of the one or more technologies further comprises receiving configuration information and provider information.

10. The computer-implemented method of claim 9, wherein processing each of the one or more technologies further comprises providing one or more acceptance levels.

11. The computer-implemented method of claim 10, wherein the one or more acceptance levels comprise unaccepted, likely unaccepted, indecisive, likely accepted, and accepted.

12. The computer-implemented method of claim 1, wherein processing each of the one or more technology configurations further comprises applying rules.

13. The computer-implemented method of claim 1, further comprising providing the target technology configuration.

14. The computer-implemented method of claim 1, further comprising generating a manual input request.

15. The computer-implemented method of claim 14, wherein the manual input request comprises a proposed solution.

16. The computer-implemented method of claim 15, wherein the manual input request comprises the request.

17. The computer-implemented method of claim 1, wherein the one or more technologies comprise a dedicated link technology, a content distribution network technology, a hardware-based acceleration solution technology, a software-based acceleration solution technology, and a best-effort internet solution technology.

18. The computer-implemented method of claim 1, wherein the one or more technology configurations comprise a local instance configuration, a local knowledge configuration, local resources configuration, a remote service configuration, and a new remote service configuration.

19. A non-transitory computer-readable storage medium coupled to one or more processors and having instructions stored thereon which, when executed by the one or more processors, cause the one or more processors to perform operations for . . . , the operations comprising:

receiving a request, the request comprising a plurality of properties;

processing the request using a plurality of classifiers to generate a plurality of request classes associated with the plurality of properties, each classifier classifying the request based on a respective property;

processing the plurality of request classes using a first neural network to identify one or more technologies relevant to the request, each technology of the one or more technologies comprising one or more assets, each neuron of the first neural network representing a class of technology that can be utilized to address the request;

processing each of the one or more technologies using a second neural network to identify one or more technology configurations for each of the one or more technologies, each neuron of the second neural network representing a respective configuration class, each technology configuration comprising, for a respective technology, one or more values of one or more parameters of respective assets of the one or more assets; and processing each of the one or more technology configurations to identify a target technology configuration.

20. A system, comprising:

a computing device; and a computer-readable storage device coupled to the computing device and having instructions stored thereon which, when executed by the computing device, cause the computing device to perform operations for selecting an on-demand technology configuration, the operations comprising:

receiving a request, the request comprising a plurality of properties;

processing the request using a plurality of classifiers to generate a plurality of request classes associated with the plurality of properties, each classifier classifying the request based on a respective property;

processing the plurality of request classes using a first neural network to identify one or more technologies relevant to the request, each technology of the one or more technologies comprising one or more assets, each neuron of the first neural network representing a class of technology that can be utilized to address the request;

processing each of the one or more technologies using a second neural network to identify one or more technology configurations for each of the one or more technologies, each neuron of the second neural network representing a respective configuration class, each technology configuration comprising, for a respective technology, one or more values of one or more parameters of respective assets of the one or more assets; and processing each of the one or more technology configurations to identify a target technology configuration.

* * * * *